Aug. 5, 1930.   E. S. MASON   1,772,188
PRESSURE INDICATING DEVICE
Filed Nov. 13, 1926    2 Sheets-Sheet 2

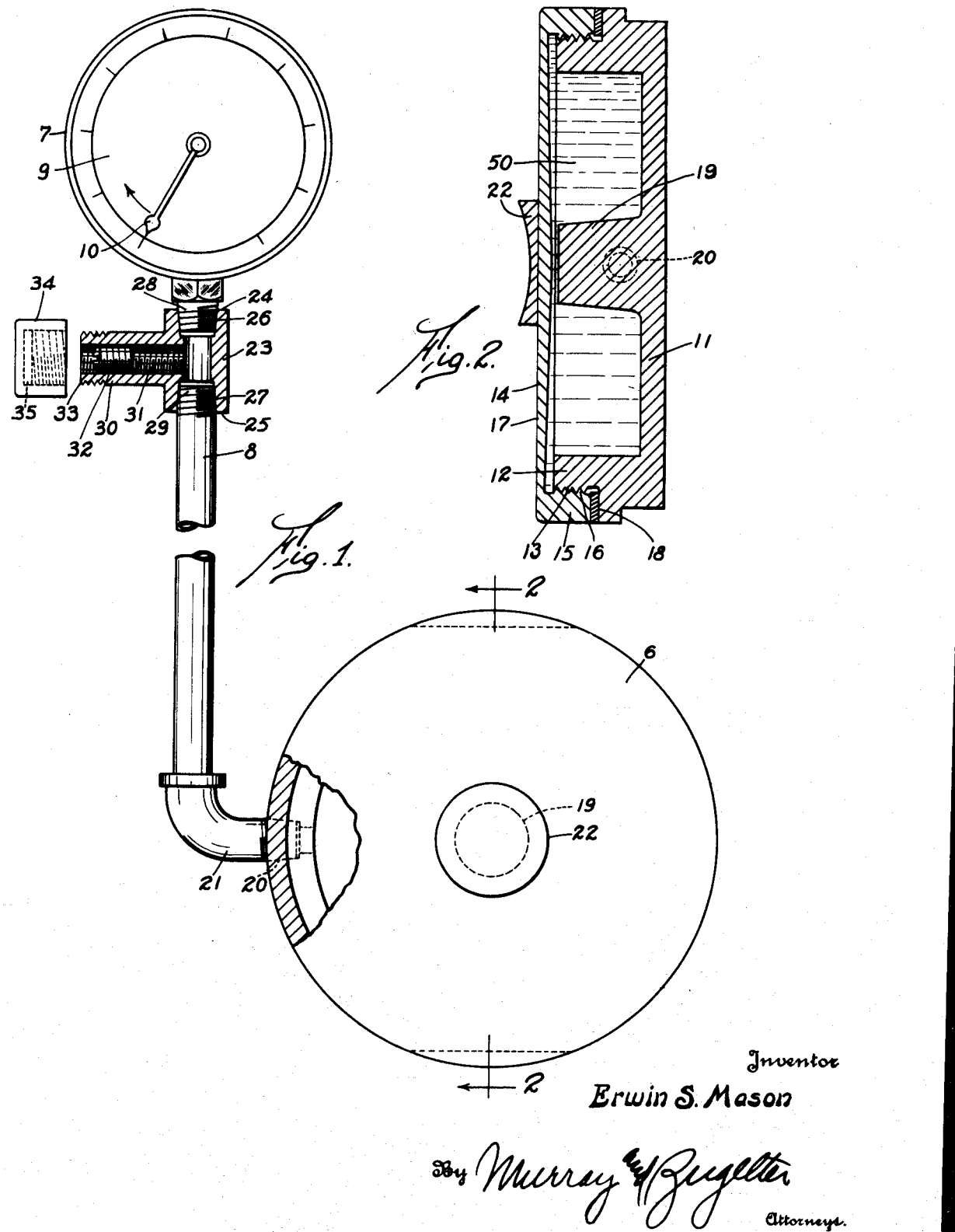

Inventor
Erwin S. Mason
By Murray E. Engelter
Attorneys.

Patented Aug. 5, 1930

1,772,188

UNITED STATES PATENT OFFICE

ERWIN S. MASON, OF NORWOOD, OHIO, ASSIGNOR TO THE J. H. DAY COMPANY, OF CINCINNATI, OHIO, A CORPORATION OF OHIO

PRESSURE-INDICATING DEVICE

Application filed November 13, 1926. Serial No. 148,195.

This invention relates to pressure indicating devices of the type used for measuring the pressure between surfaces or bodies subjected to such pressure.

An object of this invention is to provide a measuring device which is accurate, and which, having been once adjusted, retains its adjustment for a long period of time.

Another object is to provide a device of this kind which is practically indestructible.

Another object is to provide a device which is simple and inexpensive to manufacture.

These and other objects are attained by the means described herein and disclosed in the accompanying drawings, in which:

Fig. 1 is an elevational view partly in cross section showing the device of the invention.

Fig. 2 is a cross sectional view taken on line 2—2 of Fig. 1.

Figure 3:
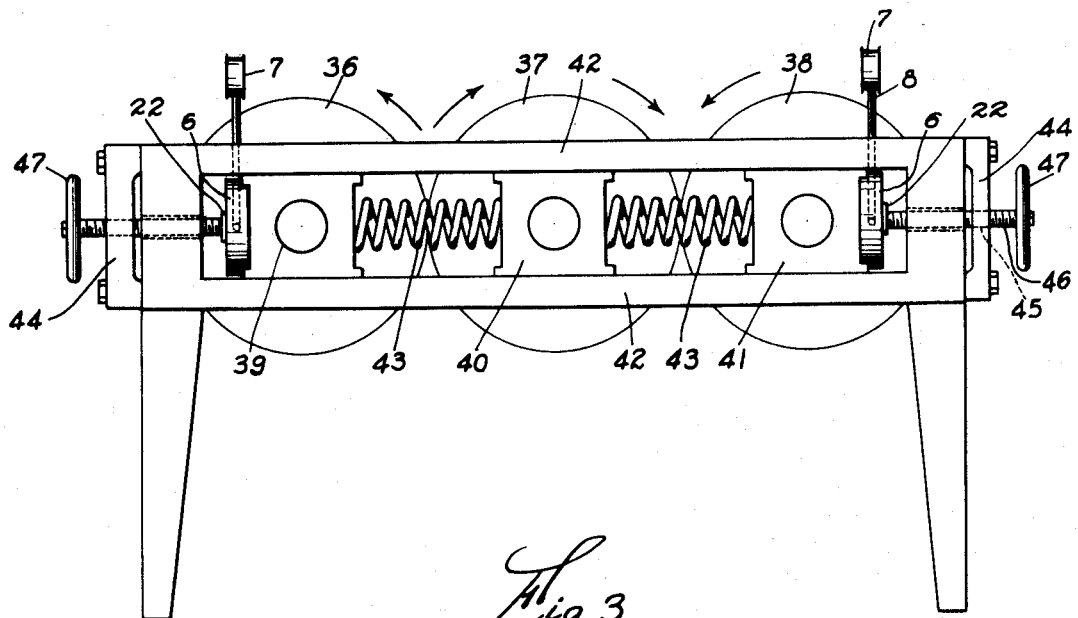
Fig. 3 is a view showing the pressure indicator applied to an ink mill for measuring the pressure between the rolls thereof.

The device of the invention comprises generally a closed drum or container 6, and a pressure gauge 7, connected by a suitable length of pipe or tubing 8. The gauge 7 is provided with the usual dial 9 and indicator hand 10. Drum or container 6 comprises a circular base portion 11 provided with an annular flange 12 having formed thereon threads 13. A closure cap 14 has an annular flange 15 provided with complementary internal threads 16 and a yielding face 17 serving as a diaphragm. A lead washer or gasket 18 seals the joint made between the base 11 and cap 14. The joint may also be made oil-tight by welding, if desired. Base 11 is provided at its center with a safety stop 19 for limiting the extent to which the face 17 may yield under pressure. Base 11 is also provided with a tapped bore 20 adapted for receiving an elbow 21 to which the pipe or tube 8 is secured. The yielding cap 14 of the drum or container is preferably provided with a plate 22 which may be of comparatively hard metal. This plate is provided to preclude wear on the face of the diaphragm 17 when pressure is applied thereto.

Interposed between the gauge 7 and drum 6, is a filler member 23 provided with adjusting means. The filler member 23 is of T shape, provided at the ends 24 and 25, with threaded bores 26 and 27 adapted to receive connection 28 of the gauge, and the threaded end 29 of pipe 8, respectively. The branch 30 of member 23 is provided with internal threads 31, for receiving a threaded plug 32. The plug 32 constitutes the adjusting means for assuring a positive pressure on the indicator hand 10. The end 33 of branch 30 is externally threaded to receive a threaded cap 34, which is provided with a lead washer 35 for making the joint oil-tight.

When it is desired to prepare the device for use, cap 34 and plug 32 are removed from the filler member, and oil 50 or other noncompressible fluid is poured into the device, filling the drum 6, pipe 8, gauge 7 and filler member 23. To adjust the gauge 7, plug 32 is inserted in the bore 31, thereby exerting pressure upon the oil as the plug is screwed into the bore. This causes a deflection of the indicator hand 10, to a position in advance of the first graduation on the dial 9. Leakage of the oil around the threads of plug 32 allows the hand 10 to slowly move toward its normal position of rest. While the hand 10 is thus moving, and as it approaches the first graduation on the dial 9, the leak proof cap 34 is screwed onto the end 33 of the filler member. The gauge is now adjusted and is ready for use.

It is evident that pressure applied to the faces of the drum or container 6 will exert pressure upon the oil or other noncompressible fluid within the drum 6, which pressure will be transmitted through pipe 8, to the pressure gauge 7. In the event that a dangerous degree of pressure is applied to the drum, so as to collapse the drum, yielding face 17 acting as a diaphragm abuts stop 19, thus precluding further yielding. Injury to the drum is thereby precluded.

In Fig. 3 is shown an ink mill having applied thereto, the device of the invention. The machine comprises cylindrical rolls 36, 37 and 38, mounted in bearings 39, 40 and 41. The bearing 40 supporting roll 37, is fixedly secured between rails or housings 42 of the ink mill. The bearings 39 and 41 are slidably mounted between the rails. Springs 43 tend to space the bearings 39 and 41 from the bearing 40. Plates 44 are provided with threaded bores 45 for receiving screws 46 provided with hand wheels 47. The screws may be advanced for moving the bearings 39 and 41 so that rolls 36 and 38 contact roll 37.

Heretofore equal pressure along the faces of the rolls was practically impossible, as screws 46 could never be advanced to apply approximately equal pressures except after extensive experimentation and testing of the ground substance. However, when the pressure indicating device herein described is interposed between the end of screw 46 and bearing 41, exact readings are obtained, showing the pressure at that end of the roll supported in bearing 41. A second pressure indicating device similarly positioned at the opposite bearing supporting the same roll, may then be made to indicate the same pressure. Roll 38 is then bearing equally on roll 37 along the line of contact of the two rolls. In the same manner rolls 36 and 37 may be adjusted. The patent to Ruckriegel #1,509,612 shows an ink mill to which the pressure indicator of this invention is particularly adaptable. As shown in Fig. 3 rolls 37 and 38 revolve in opposite directions as indicated by the arrows. It is obvious that, should any hard foreign substance find its way between these rolls, an abnormal amount of pressure would be registered on the pressure indicating device. The plate 44, generally of castiron, is therefore constructed so as to break, in the event that the pressure thus created exceeds the limit of the indicating device, which is determined by safety stop 19.

While the device is shown as applied to an ink mill it is evident that its application is not restricted to such machine. This indicator may be used wherever the measurement of the pressure between two faces or the like is desired.

What is claimed is:

1. In a device of the class described the combination of bearing housings, bearing blocks adjustably received by the housings, rolls having surface contact with one another and having bearings received by said bearing blocks, drums received by said bearing housings, pressure registering means operatively connected with the drums, means for placing the rolls, bearings and drums under pressure, and means subject to pressure exerted on said rolls, and adapted for fracture, for releasing the pressure upon increase of pressure beyond the pressure registering limit of said registering means.

2. In a roller mill, the combination of a frame comprising opposed rails having bearing blocks slidably mounted thereon, longitudinal rolls rotatably supported in the bearing blocks and adapted for surface contact upon one another, adjustable means operative upon the bearing blocks for placing the rolls under pressure, and a pressure indicating means adjacent each end of a longitudinal roll and interposed between the pressure applying means and the bearing blocks whereby the pressure at each end of said roll may be indicated.

3. In a roller mill, the combination of a frame comprising opposed rails having bearing blocks slidably mounted thereon, longitudinal pressure rolls rotatably supported in the bearing blocks and adapted for surface contact upon one another, pressure indicating means adapted for measuring the pressure exerted upon the pressure rolls, means for placing the rolls, bearing blocks and indicating means under pressure, and means subject to the pressure exerted on said rolls and adapted for fracture, for releasing the pressure on the rolls upon the increase of said pressure to a point beyond the capacity of the indicating means.

4. The combination of a frame, a slidable member and a fracturable plate mounted on the frame, means associated with said plate for advancing the slidable member toward a limit of movement, a pressure gage responsive to the pressure exerted upon the slidable member by said advancing means and comprising a non-yielding stop for precluding injury to the gage when excessive pressure is applied thereon, said excessive pressure being released by breaking of the fracturable plate.

5. In a roller mill, the combination of a frame comprising opposed rails having bearing blocks slidably mounted thereon, longitudinal rolls rotatably supported in the bearing blocks and adapted for surface contact upon one another, adjustable means operative upon the bearing blocks for placing the rolls under pressure, a pressure indicating means having a stop interposed between the pressure applying means and the bearing blocks, and a fracturable means subjected to the force of the pressure applying means, said fracturable means being adapted to break for releasing pressure upon the stop of the indicating means.

In testimony whereof, I, have hereunto subscribed my name this 9th day of November, 1926.

ERWIN S. MASON.